United States Patent
Erbas-Sen et al.

(10) Patent No.: US 10,088,159 B2
(45) Date of Patent: Oct. 2, 2018

(54) ACTIVE COOLING OF GROMMET BOSSES FOR A COMBUSTOR PANEL OF A GAS TURBINE ENGINE

(71) Applicant: United Technologies Corporation, Hartford, CT (US)

(72) Inventors: Nurhak Erbas-Sen, Manchester, CT (US); James B. Hoke, Tolland, CT (US); John S. Tu, West Hartford, CT (US); Monica Pacheco-Tougas, Waltham, MA (US)

(73) Assignee: United Technologies Corporation, Farmington, CT (US)

( * ) Notice: Subject to any disclaimer, the term of this patent is extended or adjusted under 35 U.S.C. 154(b) by 337 days.

(21) Appl. No.: 14/773,990

(22) PCT Filed: Mar. 11, 2014

(86) PCT No.: PCT/US2014/023504
§ 371 (c)(1),
(2) Date: Sep. 9, 2015

(87) PCT Pub. No.: WO2014/197045
PCT Pub. Date: Dec. 11, 2014

(65) Prior Publication Data
US 2016/0025342 A1    Jan. 28, 2016

Related U.S. Application Data

(60) Provisional application No. 61/777,828, filed on Mar. 12, 2013.

(51) Int. Cl.
| | |
|---|---|
| *F23R 3/00* | (2006.01) |
| *F23R 3/06* | (2006.01) |
| *F02C 7/18* | (2006.01) |

(52) U.S. Cl.
CPC ............. *F23R 3/002* (2013.01); *F02C 7/18* (2013.01); *F23R 3/005* (2013.01); *F23R 3/007* (2013.01); *F23R 3/06* (2013.01); *F23R 2900/03041* (2013.01); *F23R 2900/03042* (2013.01); *F23R 2900/03044* (2013.01); *Y02T 50/675* (2013.01)

(58) Field of Classification Search
CPC ................. F23R 3/002; F23R 3/06; F23R 2900/03041–2900/03044
See application file for complete search history.

(56) References Cited

U.S. PATENT DOCUMENTS

| | | | |
|---|---|---|---|
| 4,622,821 A | 11/1986 | Madden | |
| 4,700,544 A | 10/1987 | Fucci | |
| 4,887,432 A | 12/1989 | Mumford et al. | |
| 7,013,634 B2 * | 3/2006 | Pidcock | F23R 3/002 60/39.821 |
| 2003/0182942 A1 | 10/2003 | Gerendas | |
| 2003/0213250 A1 | 11/2003 | Pacheco-Tougas et al. | |
| 2007/0051110 A1 * | 3/2007 | Holland | F23R 3/06 60/776 |

(Continued)

OTHER PUBLICATIONS

EP search report for EP14807114.5 dated Feb. 2, 2016.

*Primary Examiner* — Pascal M Bui Pho
*Assistant Examiner* — Katheryn Malatek

(57) ABSTRACT

A liner assembly for a combustor of a gas turbine engine according to one disclosed non-limiting embodiment of the present disclosure includes a grommet with a multiple of grommet cooling passages.

15 Claims, 10 Drawing Sheets

(56) References Cited

U.S. PATENT DOCUMENTS

| | | | |
|---|---|---|---|
| 2007/0130953 A1 | 6/2007 | Burd et al. | |
| 2008/0115499 A1 | 5/2008 | Patel et al. | |
| 2009/0064657 A1* | 3/2009 | Zupanc | F02C 7/264 60/39.821 |
| 2010/0212324 A1* | 8/2010 | Bronson | F02C 7/264 60/752 |
| 2012/0297778 A1* | 11/2012 | Rudrapatna | F23R 3/045 60/755 |
| 2016/0091207 A1* | 3/2016 | Miyauchi | F23R 3/286 60/737 |

* cited by examiner

ACTIVE COOLING OF GROMMET BOSSES FOR A COMBUSTOR PANEL OF A GAS TURBINE ENGINE

This application claims priority to PCT Patent Appln. No. PCT/US2014/023504 filed Mar. 11, 2014, which claims priority to U.S. Patent Appln. No. 61/777,828 filed Mar. 12, 2013.

BACKGROUND

The present disclosure relates to a gas turbine engine and, more particularly, to a combustor panel with increased durability.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

The combustor section is subject to high thermal loads for prolonged time periods and various cooling arrangements are provided. Among these are impingement cooling on a backside and film cooling on a gas side to maintain temperatures within material limits.

Although these cooling arrangements are effective and the combustor section is for the most part, robust and durable, the thermal load may be non-uniform in some locations such that the combustor section may experience differential thermal growth, stress, strain and wear that may negatively effect service life.

SUMMARY

A liner assembly for a combustor of a gas turbine engine according to one disclosed non-limiting embodiment of the present disclosure includes a grommet with a multiple of grommet cooling passages.

In a further embodiment of the present disclosure, the multiple of grommet cooling passages define an angle with respect to a hot side of a heat shield.

In a further embodiment of any of the foregoing embodiments of the present disclosure, the multiple of grommet cooling passages include a multiple of leading edge grommet cooling passages directed generally downstream.

In a further embodiment of any of the foregoing embodiments of the present disclosure, the multiple of grommet cooling passages include a multiple of trailing edge grommet cooling passages directed generally upstream.

In a further embodiment of any of the foregoing embodiments of the present disclosure, the multiple of grommet cooling passages include a multiple of leading edge grommet cooling passages directed generally downstream and a multiple of trailing edge grommet cooling passages directed generally upstream.

In a further embodiment of any of the foregoing embodiments of the present disclosure, the multiple of leading edge grommet cooling passages are opposed to the multiple of trailing edge grommet cooling passages.

In a further embodiment of any of the foregoing embodiments of the present disclosure, the multiple of grommet cooling passages are generally perpendicular with respect to a line draw through a ninety (90) and a two-hundred seventy (270) degree position with respect to the grommet.

In a further embodiment of any of the foregoing embodiments of the present disclosure, a zero (0) degree position is arranged with respect to a local combustion gas flow.

In a further embodiment of any of the foregoing embodiments of the present disclosure, the zero (0) degree position is non-parallel to an engine central longitudinal axis A.

In a further embodiment of any of the foregoing embodiments of the present disclosure, the zero (0) degree position is parallel to an engine central longitudinal axis A.

In a further embodiment of any of the foregoing embodiments of the present disclosure, the grommet surrounds a dilution hole.

In a further embodiment of any of the foregoing embodiments of the present disclosure, the grommet is integral with a heat shield.

In a further embodiment of any of the foregoing embodiments of the present disclosure, the grommet is mounted to a heat shield In a further embodiment of any of the foregoing embodiments of the present disclosure, the multiple of grommet cooling passages include an inlet in a sidewall of the grommet and an outlet in a hot surface of the grommet.

In a further embodiment of any of the foregoing embodiments of the present disclosure, the outlet in a hot surface of the grommet is aligned with a passage in a heat shield.

In a further embodiment of any of the foregoing embodiments of the present disclosure, the multiple of grommet cooling passages include a multiple of leading edge grommet cooling passages directed generally downstream and a multiple of trailing edge grommet cooling passages directed generally upstream, the multiple of leading edge grommet cooling passages opposed to the multiple of trailing edge grommet cooling passages.

In a further embodiment of any of the foregoing embodiments of the present disclosure, the multiple of grommet cooling passages include a multiple of leading edge grommet cooling passages directed generally downstream and a multiple of trailing edge grommet cooling passages directed generally upstream, the multiple of grommet cooling passages define an angle with respect to a hot side of a heat shield A method of increasing durability of a liner assembly in a combustor of a gas turbine engine according to another disclosed non-limiting embodiment of the present disclosure includes directing an airflow through a multiple of leading edge grommet cooling passages directed generally downstream and a multiple of trailing edge grommet cooling passages directed generally upstream.

A further embodiment of any of the foregoing embodiments of the present disclosure includes directing the airflow at an angle with respect to a hot side of a heat shield.

A further embodiment of any of the foregoing embodiments of the present disclosure includes opposing the multiple of leading edge grommet cooling passages with respect to the multiple of trailing edge grommet cooling passages.

A further embodiment of any of the foregoing embodiments of the present disclosure includes locating the multiple of leading edge grommet cooling passages parallel to the multiple of trailing edge grommet cooling passages.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
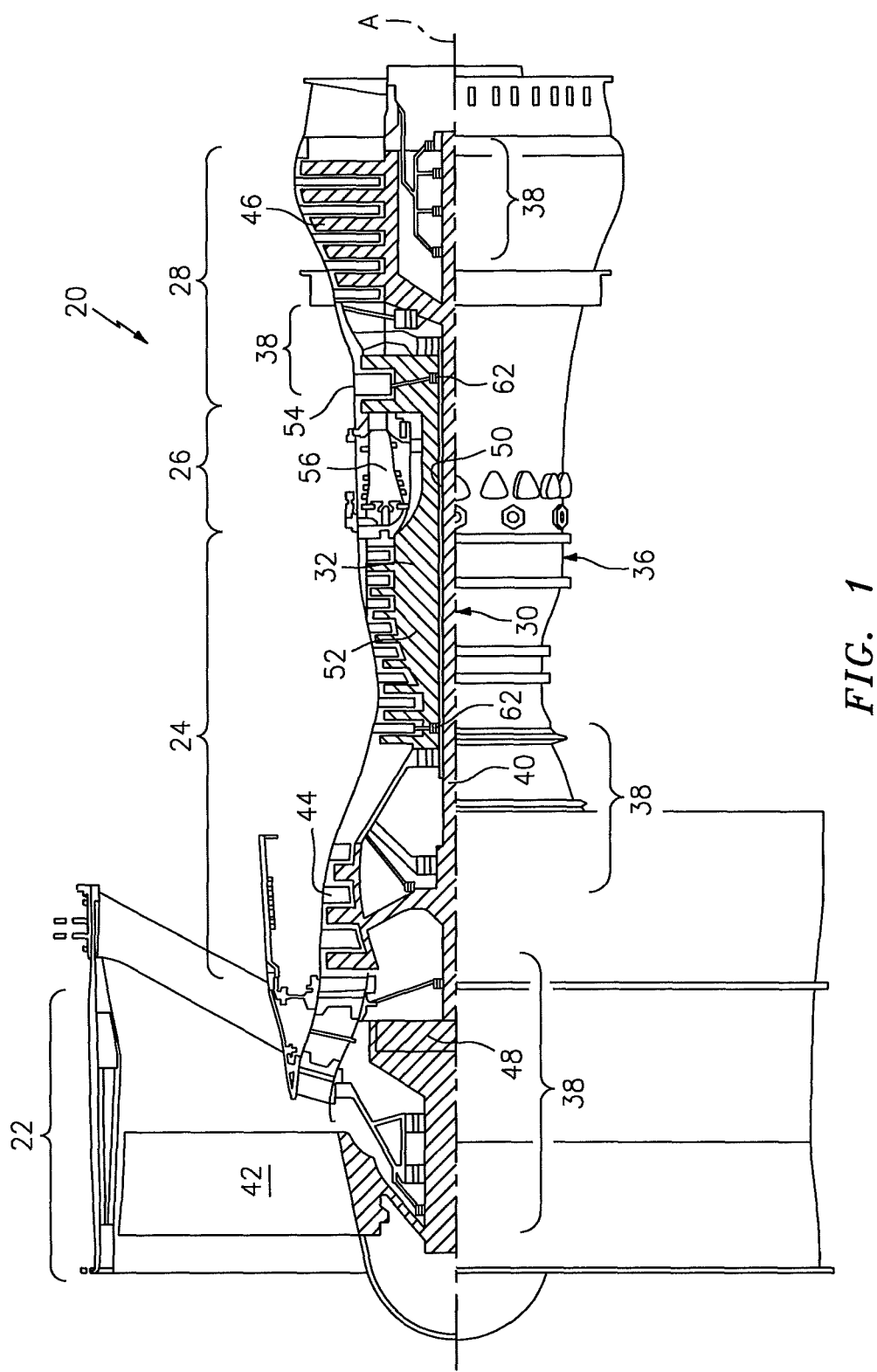
FIG. 1 is a schematic cross-section of a gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis "A" relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by compartments 38 within the static structure 36. It should be understood that various compartments 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided along the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade in the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 2:
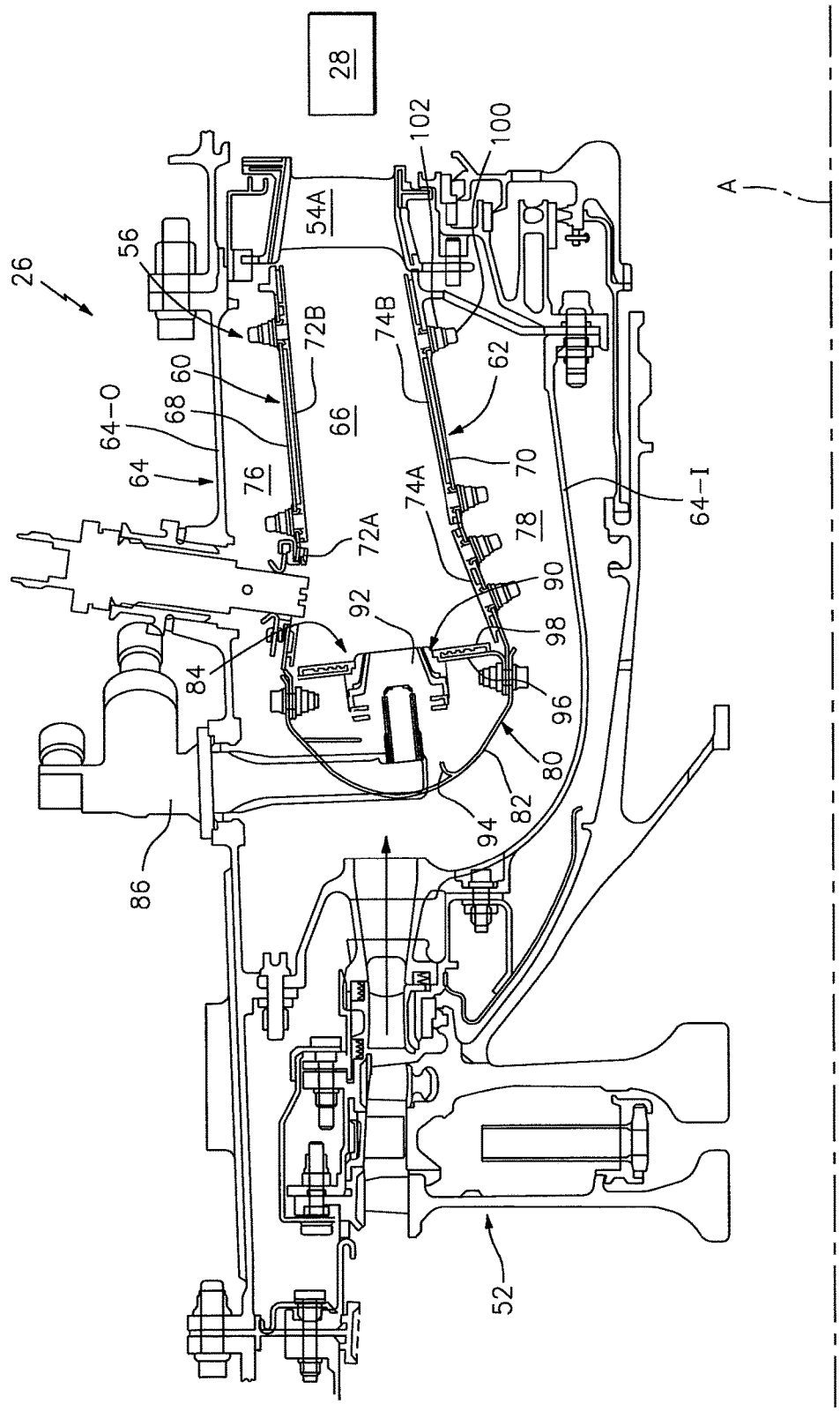
FIG. 2 is a longitudinal schematic sectional view of a combustor section according to one non-limiting embodiment that may be used with the gas turbine engine shown in FIG. 1.

With reference to FIG. 2, the combustor 56 generally includes an outer combustor liner assembly 60, an inner combustor liner assembly 62 and a diffuser case module 64. The outer combustor liner assembly 60 and the inner combustor liner assembly 62 are spaced apart such that a combustion chamber 66 is defined therebetween. The combustion chamber 66 is generally annular in shape.

The outer combustor liner assembly 60 is spaced radially inward from an outer diffuser case 64-O of the diffuser case module 64 to define an outer annular plenum 76. The inner combustor liner assembly 62 is spaced radially outward from an inner diffuser case 64-I of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustor liner assemblies 60, 62 contain the combustion products for direction toward the turbine section 28. Each combustor liner assembly 60, 62 generally includes a respective support shell 68, 70 which supports one or more heat shields 72, 74 mounted to a hot side of the respective support shell 68, 70. Each of the heat shields 72, 74 may be generally rectilinear and manufactured of, for example, a nickel based super alloy, ceramic or other temperature resistant material and are arranged to form a liner array (also shown in FIG. 3). In one disclosed non-limiting embodiment, the liner array includes a multiple of forward heat shields 72A and a multiple of aft heat shields 72B that are circumferentially staggered (FIG. 4) to line the hot side of the outer support shell 68. A multiple of forward heat shields 74A and a multiple of aft heat shields 74B are circumferentially staggered to line the hot side of the inner support shell 70.

The combustor 56 further includes a forward assembly 80 immediately downstream of the compressor section 24 to receive compressed airflow therefrom. The forward assembly 80 generally includes an annular hood 82, a bulkhead assembly 84, a multiple of fuel nozzles 86 (one shown) and a multiple of fuel nozzle guides 90 (one shown). Each of the fuel nozzle guides 90 is circumferentially aligned with one of the hood ports 94 to project through the bulkhead assembly 84. Each bulkhead assembly 84 includes a bulkhead support shell 96 secured to the combustor liner assemblies 60, 62, and a multiple of circumferentially distributed bulkhead heat shields 98 secured to the bulkhead support shell 96 around the central opening 92.

The annular hood 82 extends radially between, and is secured to, the forwardmost ends of the combustor liner assemblies 60, 62. The annular hood 82 includes a multiple of circumferentially distributed hood ports 94 that accommodate the respective fuel nozzle 86 and introduce air into the forward end of the combustion chamber 66 through a central opening 92. Each fuel nozzle 86 may be secured to the diffuser case module 64 and project through one of the hood ports 94 and through the central opening 92 within the respective fuel nozzle guide 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Spark energy is provided to the combustor 56 through an igniter 88 that extends through at least one of the multiple of radially outward forward heat shields 72A. The igniter 88 such as a frequency-pulsed igniter provides a continuous spark or other ignition source. The igniter 88 may be located in a multiple of circumferential locations around the combustor 56 in one or more outward forward heat shields 72A.

Opposite the forward assembly 80, the outer and inner support shells 68, 70 are mounted to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 4:
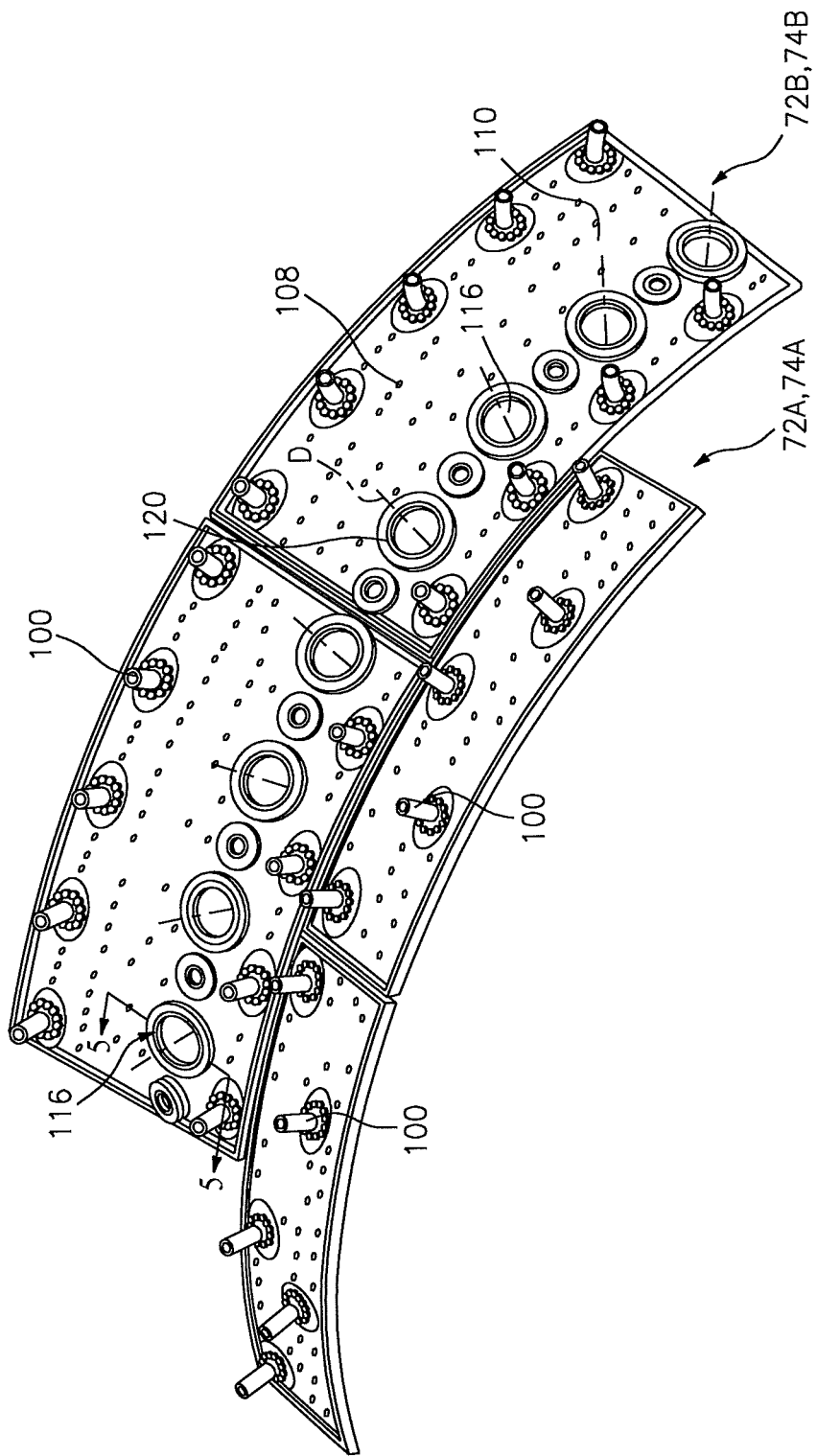
FIG. 4 is an expanded perspective view of a heat shield array from a cold side with a multiple of integral grommets with grommet cooling passages.

A multiple of studs 100 extend from the heat shields 72, 74 (also shown in FIG. 4). The multiple of studs 100 mount the heat shields 72, 74 to the respective support shells 68, 70 with fasteners 102 such as nuts. That is, the studs 100 project rigidly from the heat shields 72, 74 and through the respective support shells 68, 70 to receive the fasteners 102 at a threaded distal end section thereof.

Figure 3:
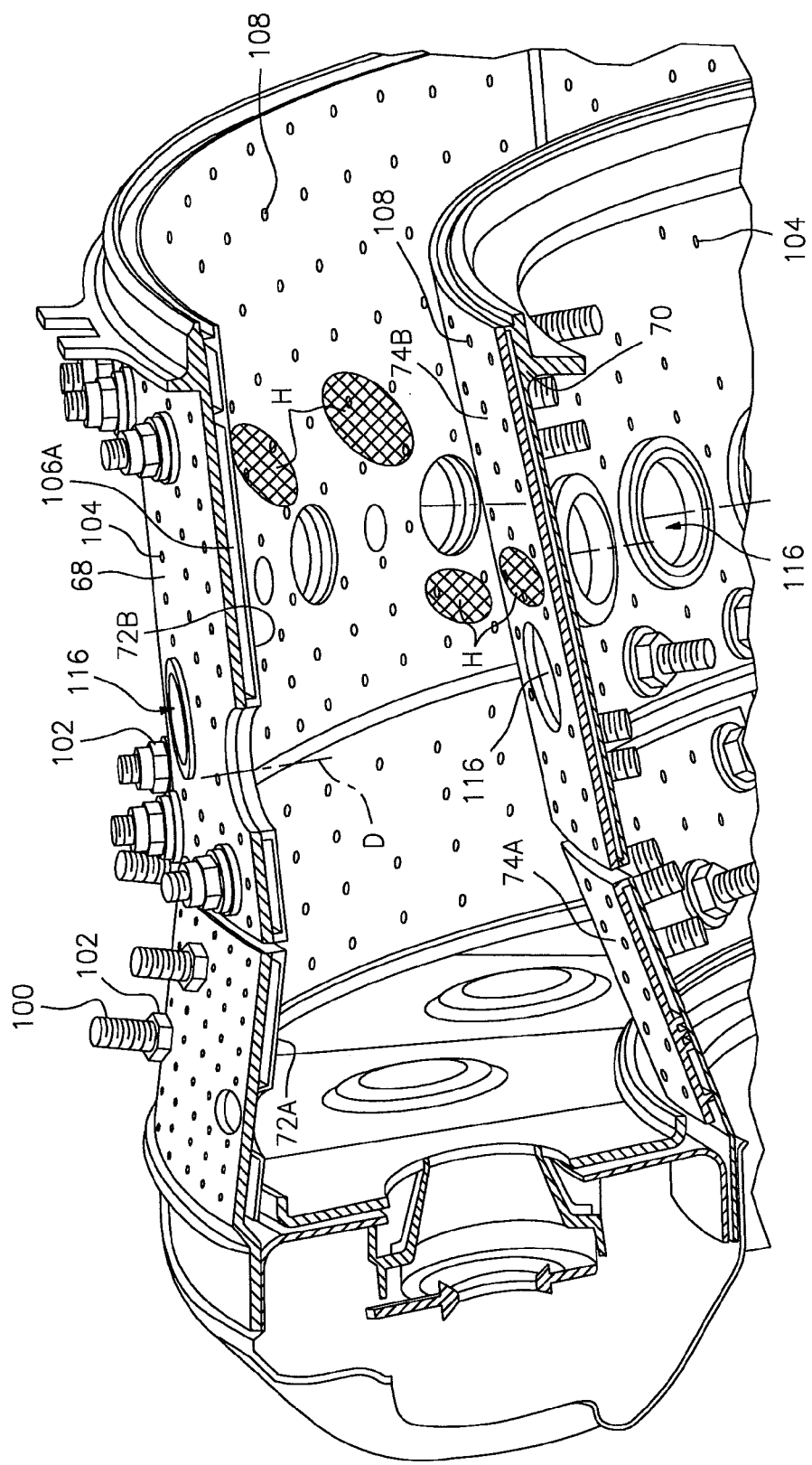
FIG. 3 is an expanded perspective sectional view of a combustor.

With reference to FIG. 3, a multiple of cooling impingement passages 104 penetrate through the support shells 68, 70 to allow air from the respective annular plenums 76, 78 to enter cavities 106A, 106B formed in the combustor liner assemblies 60, 62 between the respective support shells 68, 70 and heat shields 72, 74.

The cooling impingement passages 104 are generally normal to the surface of the heat shields 72, 74. The air in the cavities 106A, 106B provides backside impingement cooling of the heat shields 72, 74 that is generally defined herein as heat removal via internal convection.

A multiple of cooling film passages 108 penetrate through each of the heat shields 72, 74. The geometry of the film passages, e.g, diameter, shape, density, surface angle, incidence angle, etc., as well as the location of the passages with respect to the high temperature combustion flow also contributes to effusion film cooling. The combination of cooling impingement passages 104 and cooling film passages 108 within the respective support shells 68, 70 and heat shields 72, 74 may often be referred to as an Impingement Film Floatliner assembly.

A multiple of dilution holes 116 penetrate through both the respective support shells 68, 70 and heat shields 72, 74 along a common axis D (also shown in FIG. 4). For example only, in a Rich-Quench-Lean (R-Q-L) type combustor, the dilution holes 116 are located downstream of the forward assembly 80 to quench the combustion gases to supply cooling air into the combustor 56. It should be understood that other combustor types will also benefit herefrom.

The cooling film passages 108 allow the cooling air to pass from the cavities 106A, 106B defined in part by a cold side 110 of the heat shields 72, 74 to a hot side 112 of the heat shields 72, 74 and thereby facilitate the formation of a film of cooling air along the hot side 112. Rails 118 extend from a cold side 110 of each of the heat shields 72, 74 to form an interface that at least partially defines the cavities 106A, 106B. It should be appreciated that various rails 118 may be provided to segregate, support and seal each of the heat shields 72, 74 on their respective support shells 68, 70. Furthermore, the rails 118 may segregate individual heat shields 72, 74.

The cooling film passages 108 are generally more numerous than the cooling impingement passages 104 to promote the development of a film cooling along the hot side 112 to sheath the heat shields 72, 74 on a combustion gas side. Film cooling as defined herein is the introduction of a relatively cooler airflow at one or more discrete locations along a surface exposed to a high temperature environment to protect that surface in the immediate region of the airflow injection as well as downstream thereof.

In some cases, local hot spots H may form on the heat shield 72, 74, or other panels within the combustor 56. Hot spots H often typically occur in about ten to twenty percent (10%-20%) of the surface area of the heat shields 72, 74. Oftentimes, a hot spot H forms downstream from each of the multiple of fuel nozzles 86 adjacent to the dilution holes 116, however other locations may also be subject to hot spot H formation. It should be appreciated that hot spot H location identification may be determined experimentally and/or analytically.

Figure 5:
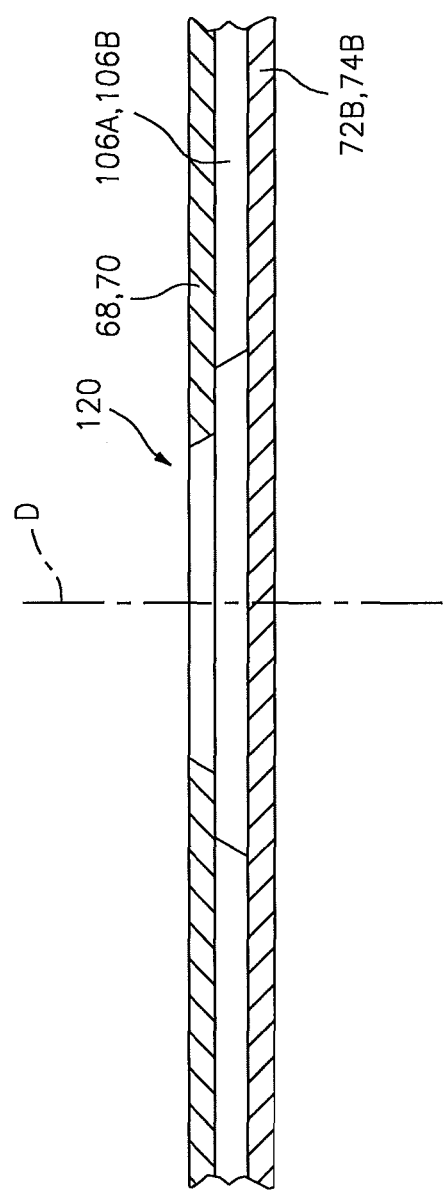
FIG. 5 is a longitudinal cross sectional view through a combustor liner assembly with an integral grommet with grommet cooling passages.

With reference to FIG. 4, each of the multiple of dilution holes 116 are defined by a grommet 120 around the axis D. The grommet 120 in one disclosed non-limiting embodiment is integral with the heat shields 72, 74 (shown in heat shield 72B, 74B in FIG. 4). That is, the grommet 120 extends from the cold side 110 of each of the heat shields 72, 74 to define an essentially circular rail to seat the respective support shells 68, 70 to seal the cavities 106A, 106B around the dilution aperture 116 (FIG. 5).

Figure 6:
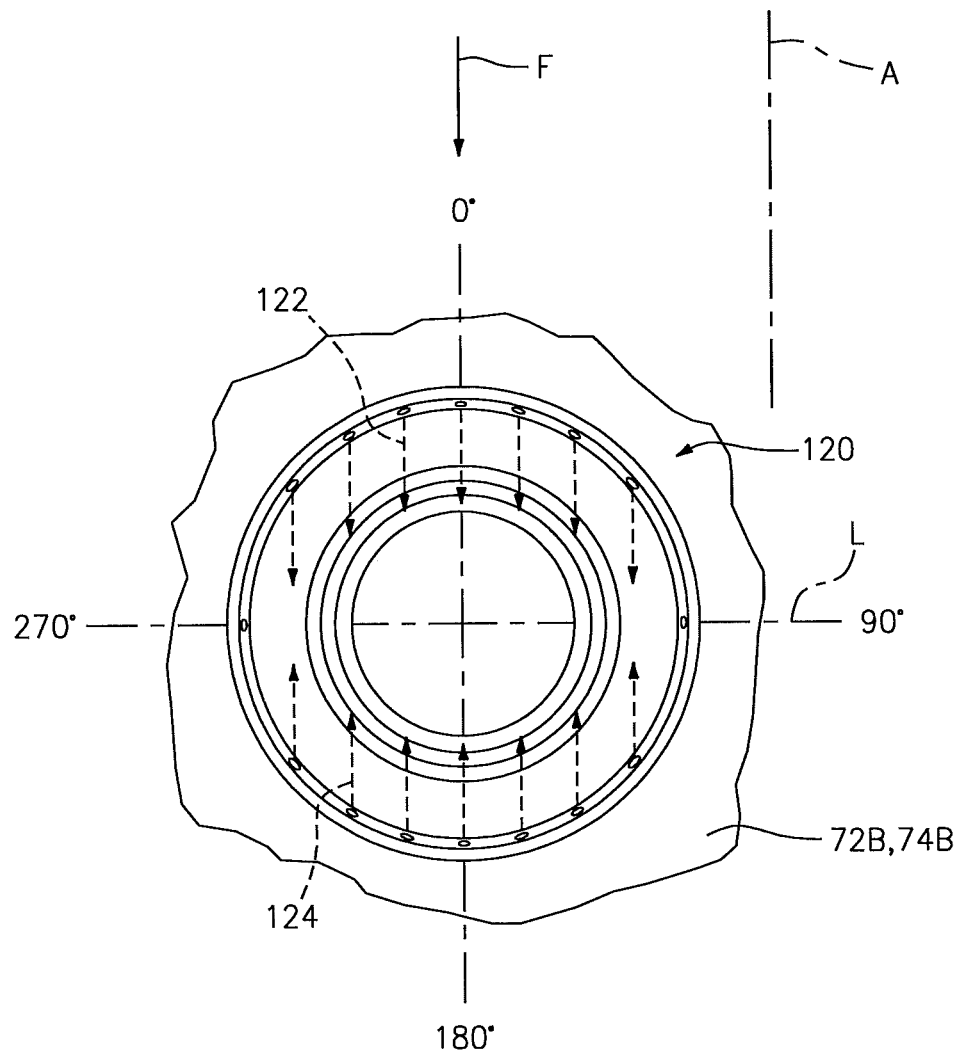
FIG. 6 is an expanded top view of a heat shield from a hot side with an integral grommet with grommet cooling passages according to one disclosed non-limiting embodiment.

With reference to FIG. 6, each grommet 120 includes a multiple of leading edge (LE) grommet cooling passages 122 and a multiple of trailing edge (TE) grommet cooling passages 124. That is, the multiple of leading edge (LE) grommet cooling passages 122 may be defined around a semi-circular arc defined between about a two-hundred seventy (270) and ninety (90) degree position to include the zero (0) degree position while the trailing edge (TE) grommet cooling passages 124 may be defined around a semi-circular arc defined between about the ninety (90) and two-hundred seventy (270) degree position to include the one-hundred eighty (180) degree position (FIG. 6). It should be appreciated that the zero (0) degree position may be arranged with respect to the local combustion gas flow (illustrated schematically by arrow F) that may or may not have a circumferential component with respect to the engine central longitudinal axis A.

Figure 7:
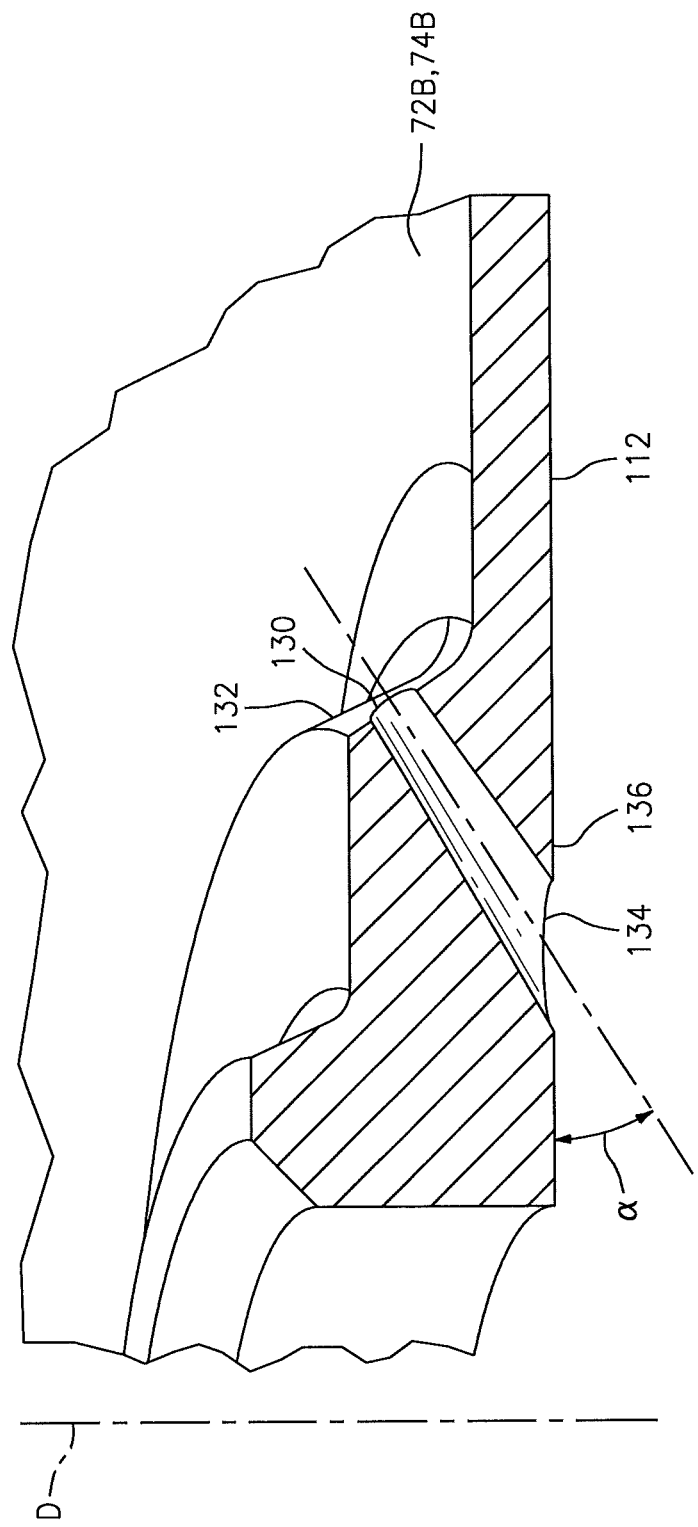
FIG. 7 is an expanded perspective view of a heat shield from a hot side with an integral grommet with grommet cooling passages according to one disclosed non-limiting embodiment.

The multiple of leading edge (LE) grommet cooling passages 122 face generally downstream or towered the one-hundred eighty (180) degree position. The multiple of trailing edge (TE) grommet cooling passages 124 face generally upstream or toward the zero (0) degree position. In one disclosed non-limiting embodiment, the grommet cooling passages 122, 124 are generally perpendicular with respect to a line L draw through the ninety (90) and two-hundred seventy (270) degree position (FIG. 7). In other words, the grommet cooling passages 122, 124 are not all directed toward axis D but the multiple of leading edge (LE) grommet cooling passages 122 are opposed and generally parallel with the multiple of trailing edge (TE) grommet cooling passages 124. It should be appreciated that the number of grommet cooling passages 122, 124 may be selected and arranged with respect to the hot spots.

Figure 8:
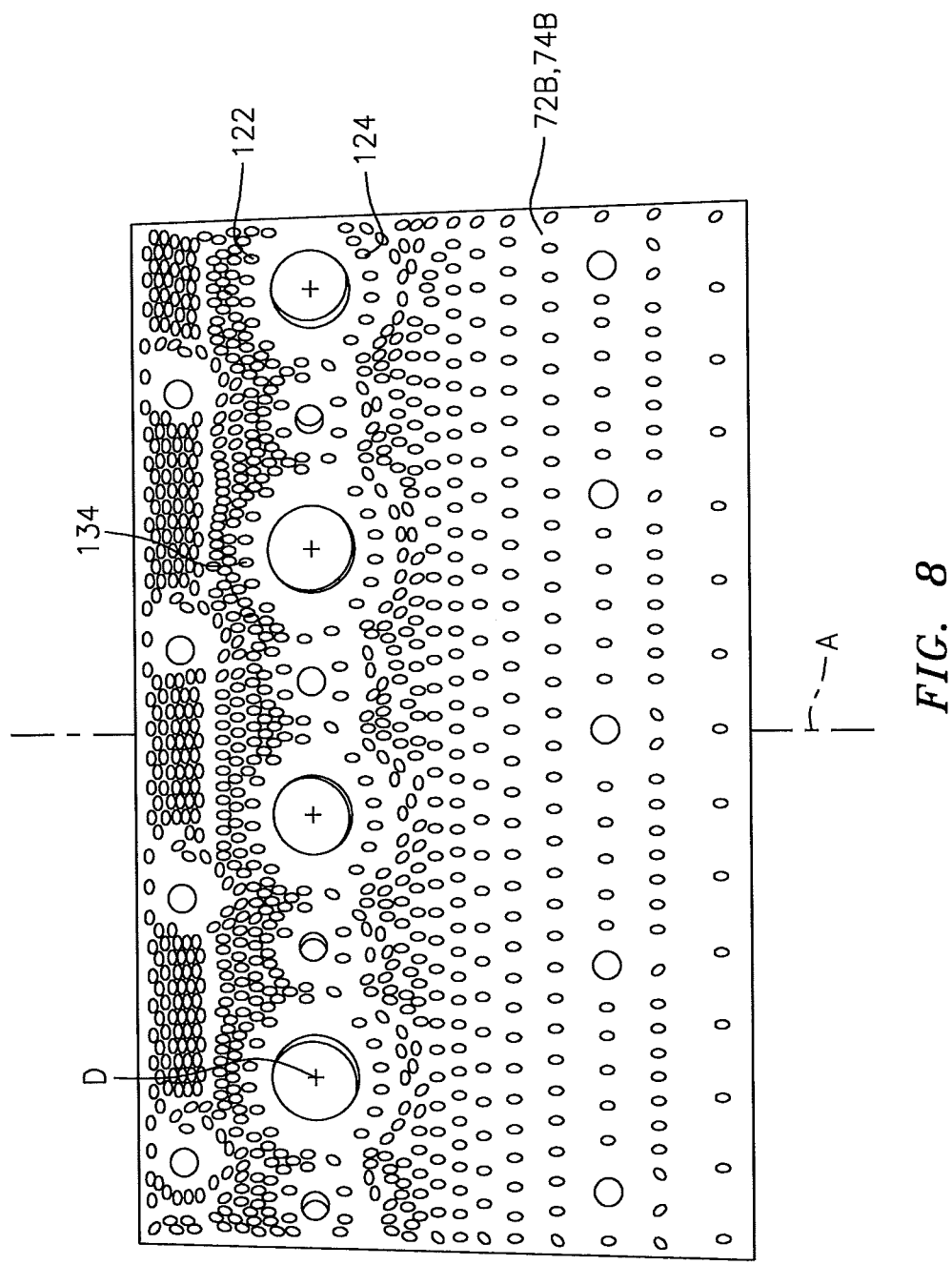
FIG. 8 is an expanded cross-sectional view of outlets in a heat shield from a multiple of leading edge (LE) grommet cooling passages and a multiple of trailing edge (TE) grommet cooling passages.

With reference to FIG. 7, in one disclosed non-limiting embodiment, each of the grommet cooling passages 122, 124 provide an inlet 130 in a sidewall 132 of the grommet 120 and an outlet 134 on the hot side 136 of the grommet 120. The hot side 136 of the grommet 120 is flush and integral with the hot side 112 of the heat shields 72, 74 (also shown in FIG. 8). That is, the grommet 120 is integrally formed in the heat shields 72, 74. It should be appreciated that the grommet 120 may alternatively be a separate component that is welded into the heat shields 72, 74 for purposes of aftermarket service and/or repair.

In another disclosed non-limiting embodiment, the grommet cooling passages 122, 124 are define an angle alpha with respect to the hot side 112 to sheath the heat shields 72, 74. In still another disclosed non-limiting embodiment, the grommet cooling passages 122, 124 are frustro-conical in shape from the inlet 130 to the outlet As the cooling airflow jets exit the grommet cooling passages 122, 124 the cooling airflow provides additional protection from the hot combustion gases at both the leading and trailing edges by generating a curtain effect. The curtain effect protects against damage due to combustion gas stagnation at the leading edge and vortex pair at the trailing edge of each of the multiple of dilution holes 116.

Figure 9:
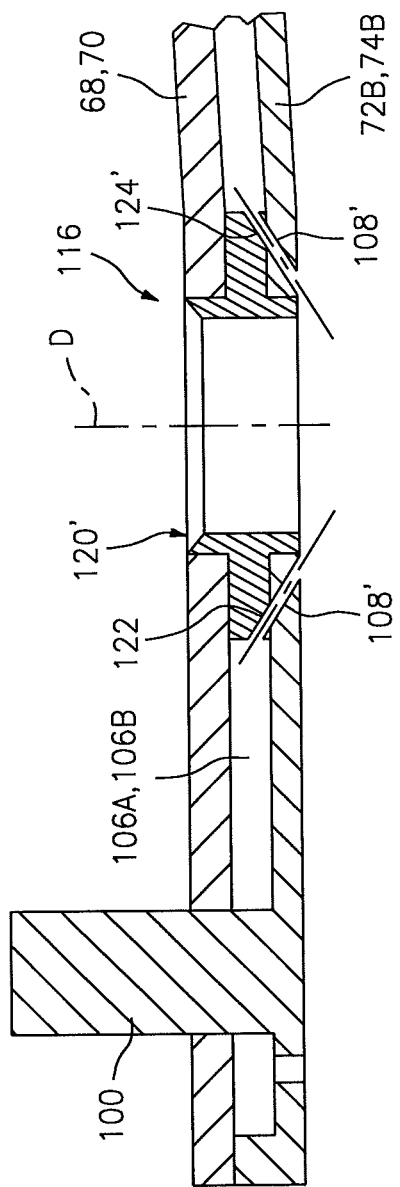
FIG. 9 is a longitudinal cross sectional view through a combustor liner of a "loose" grommet according to another disclosed non-limiting embodiment.

With reference to FIG. 9, in another disclosed non-limiting embodiment, each grommet 120' is a "loose" grommet 120' that is trapped between the respective support shells 68, 70 and heat shields 72, 74 around the axis D. That is, the grommet cooling passages 122', 124' are aligned with separate cooling passages 108' in the heat shields 72, 74. That is, the grommet cooling passages 122', 124' are coaxial with passages 108'.

Figure 10:
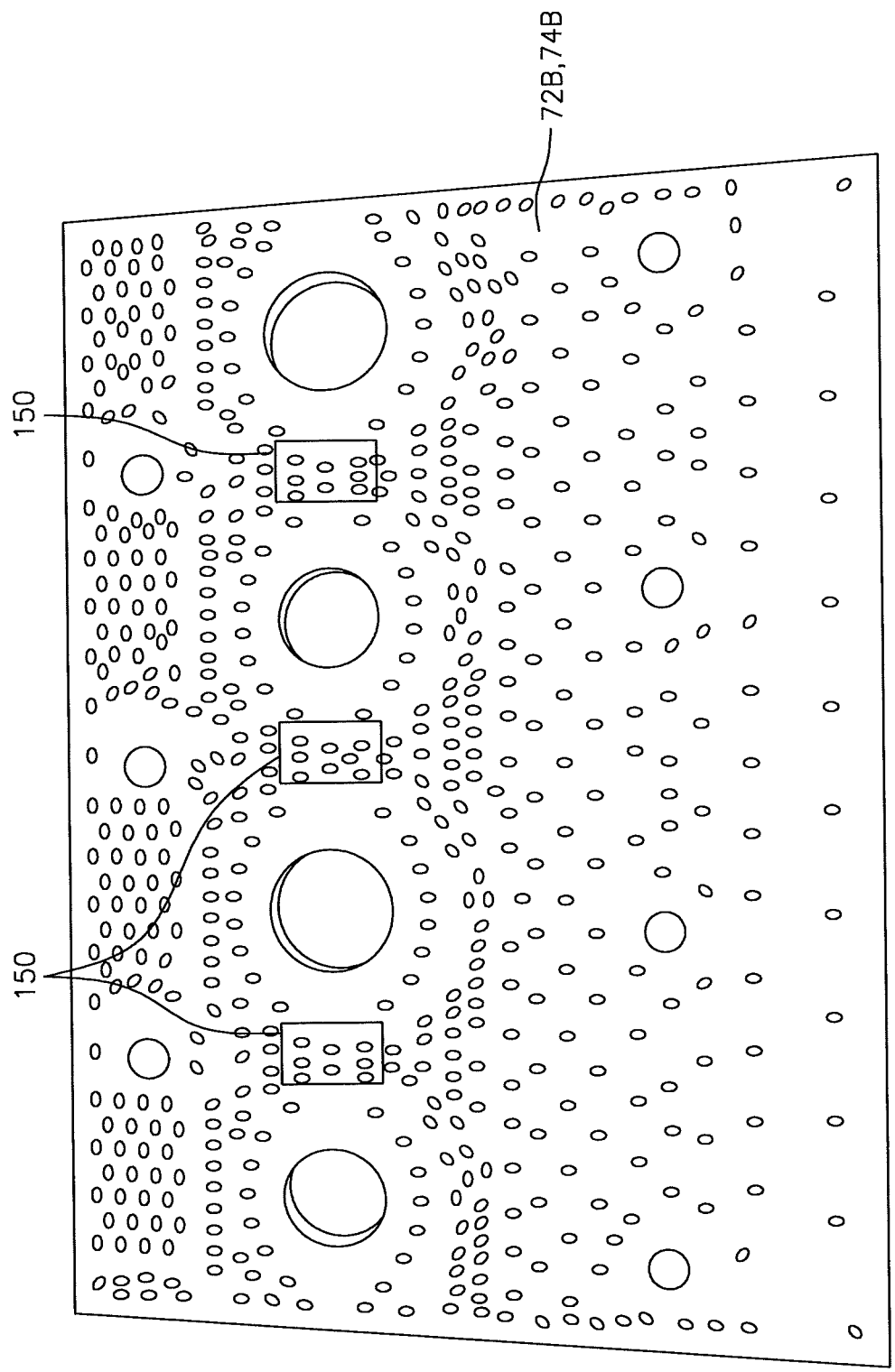
FIG. 10 is an expanded perspective view of a heat shield from a hot side according to another disclosed non-limiting embodiment.

With reference to FIG. 10, in another disclosed non-limiting embodiment, the in another disclosed non-limiting embodiment, a group of cooling passages 150 is located between each of the multiple of dilution holes 116. The group of cooling passages 150 facilitates replacement of the minor diffusion holes shown in FIG. 6.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A liner assembly for a combustor of a gas turbine engine comprising:
   a grommet with a plurality of grommet cooling passages, wherein each of said plurality of grommet cooling passages includes an inlet in a sidewall of said grommet and an outlet in a surface of said grommet that interfaces to a combustion chamber of said combustor,
   wherein said gas turbine engine is defined about a central longitudinal axis, and
   wherein each grommet cooling passage of said plurality of grommet cooling passages has a grommet cooling passage longitudinal axis which is parallel to said central longitudinal axis.

2. The liner assembly as recited in claim 1, wherein each of said plurality of grommet cooling passages define a respective angle with respect to a hot side of a heat shield.

3. The liner assembly as recited in claim 1, wherein said plurality of grommet cooling passages include a plurality of leading edge grommet cooling passages directed downstream relative to a flow of combustion gases.

4. The liner assembly as recited in claim 1, wherein said plurality of grommet cooling passages include a plurality of trailing edge grommet cooling passages directed upstream relative to a flow of combustion gases.

5. The liner assembly as recited in claim 1, wherein said plurality of grommet cooling passages include a plurality of leading edge grommet cooling passages directed downstream relative to a flow of combustion gases and a plurality of trailing edge grommet cooling passages directed upstream relative to the flow of combustion gases.

6. The liner assembly as recited in claim 5, wherein said plurality of leading edge grommet cooling passages are opposed to said plurality of trailing edge grommet cooling passages.

7. The liner assembly as recited in claim 1, wherein said grommet surrounds a dilution hole.

8. The liner assembly as recited in claim 7, wherein said grommet is integral with a heat shield.

9. The liner assembly as recited in claim 7, wherein said grommet is mounted to a heat shield.

10. The liner assembly as recited in claim 9, wherein each of said outlets of said plurality of grommet cooling passages is co-axial with a respective passage in said heat shield.

11. A method of increasing durability of a liner assembly in a combustor of a gas turbine engine, comprising:
    directing an airflow through a plurality of leading edge grommet cooling passages directed downstream with respect to a flow of combustion gases and a plurality of trailing edge grommet cooling passages directed upstream with respect to the flow of combustion gases,
    wherein each of said plurality of leading edge grommet cooling passages and plurality of trailing edge grommet cooling passages includes an inlet in a sidewall of a grommet and an outlet in a surface of said grommet that interfaces to a combustion chamber of said combustor,
    wherein said gas turbine engine is defined about a central longitudinal axis, and wherein each leading edge grommet cooling passage of said plurality of leading edge grommet cooling passages and each trailing edge grommet cooling passage of said plurality of trailing edge grommet cooling passages has a grommet cooling passage longitudinal axis which is parallel to said central longitudinal axis.

12. The method as recited in claim 11, further comprising:
    directing the airflow at an angle with respect to a hot side of a heat shield.

13. The method as recited in claim 11, further comprising:
    opposing the plurality of leading edge grommet cooling passages with respect to the plurality of trailing edge grommet cooling passages.

14. The method as recited in claim 11, further comprising:
    locating the plurality of leading edge grommet cooling passages parallel to the plurality of trailing edge grommet cooling passages.

15. A liner assembly for a combustor of a gas turbine engine comprising:
    a grommet with a plurality of grommet cooling passages, wherein each of said plurality of grommet cooling passages includes an inlet in a sidewall of said grommet and an outlet in a surface of said grommet that interfaces to a combustion chamber of said combustor,
    wherein said grommet surrounds a dilution hole,
    wherein said grommet is mounted to a heat shield, and
    wherein each of said outlets of said plurality of grommet cooling passages is co-axial with a respective passage in said heat shield.

* * * * *